United States Patent Office 3,365,870
Patented Jan. 30, 1968

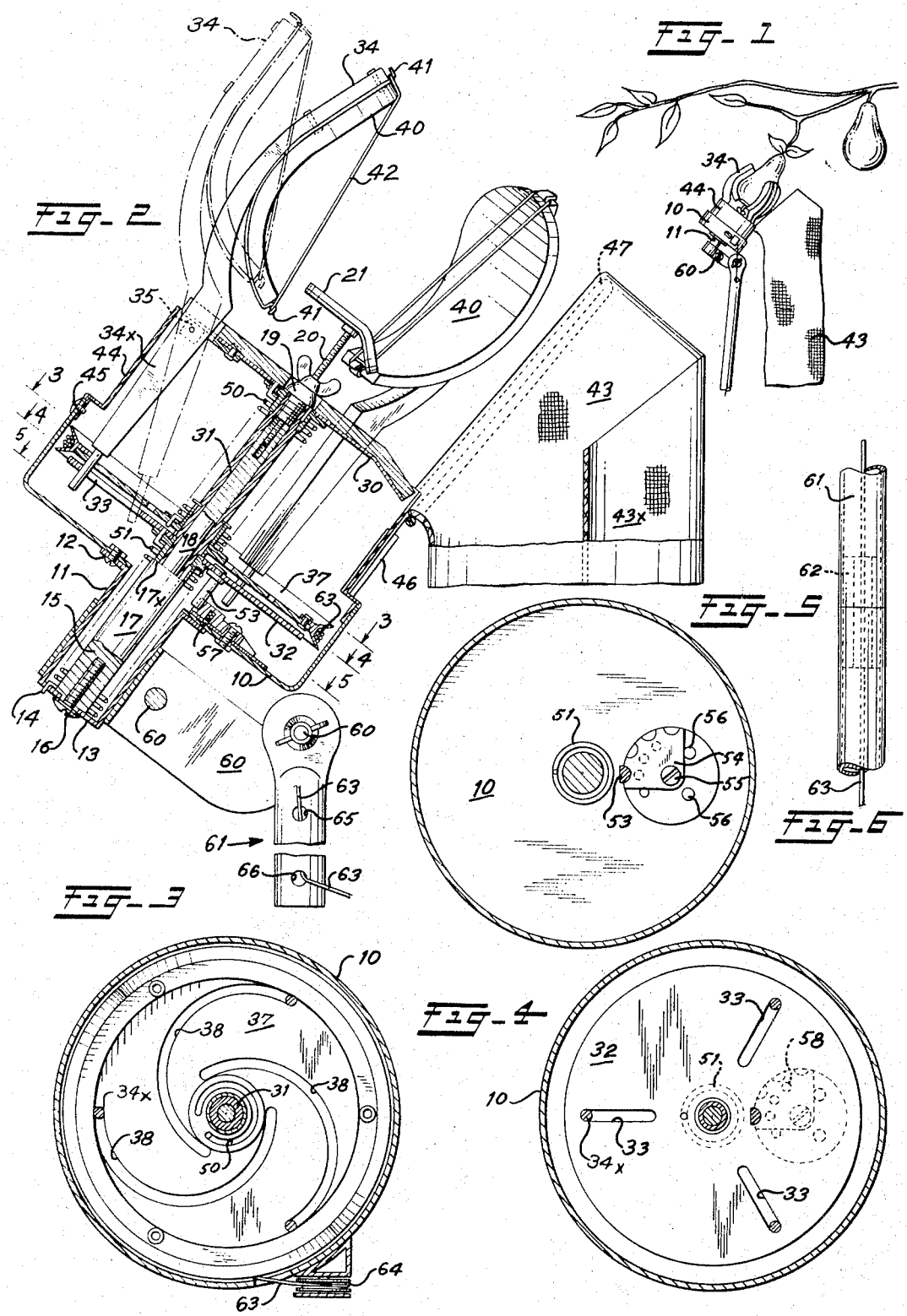

3,365,870
FRUIT PICKER
Salvatore Cardinale, 2454 Riverside Drive,
Bellmore, N.Y. 11710
Filed June 8, 1965, Ser. No. 462,343
4 Claims. (Cl. 56—334)

ABSTRACT OF THE DISCLOSURE

This invention is concerned with a hand operated fruit picker having means to close the picking fingers to seize the fruit firmly yet gently; thereafter the fruit is twisted free of the branch by rotational means in the picker. The twisting means and its operation is done in sequence to the seizing means and its operation as an overall unitary smooth operation. This overall operation is effected by a pair of co-acting interconnected spring loaded rotational means as hereinafter described in detail.

---

This invention relates to an improved fruit picker and more particularly to an improvement of the fruit picker of U.S. Patent No. 2,581,236.

According to this invention the picker fingers close upon or grasp the fruit without simultaneous rotation of said fingers and only after the fruit is grasped are the fingers rotated. The amount of rotation of the grasped fruit is about three and one-half turns, this being the number of turns needed to disengage the fruit from the branch of the tree.

Moreover, according to this improved invention the picking fingers may be adapted to pick small sized fruit.

Also according to this invention a selectively extendable tubular section pole is provided whereby the operative string is disposed within said pole and away from entangling tree branches.

This invention is described by means of an illustrative embodiment shown in the accompanying drawing and in which;

FIG. 1 is a perspective view of the fruit picker shown in relation to a pear being picked from a branch of a tree, FIG. 2 is a cross section view of the fruit picker showing the operative elements thereof and showing in dotted outline a finger in open position, FIG. 3 is a section view taken on line 3—3 of FIG. 2, FIG. 4 is a section view taken on line 4—4 of FIG. 2, FIG. 5 is a section view taken on line 5—5 of FIG. 2, and FIG. 6 is a partial view of the pole handle showing the manner of securing one pole section to another with the aid of a tubular connector.

The feature of this improvement is mainly concerned with the radial or non-rotative seizure of the fingers and thereafter a predetermined rotation of about three and one-half turns is effected to twist the fruit away from the branch. This result is accomplished by a steady pulling of the operative string wherein the pulling of about eight inches of the string radially closes the fingers and continued pulling of the string causes the fingers and the seized fruit to rotate as a unit.

After the fruit is twisted away from the branch, release of the string causes the apparatus to unwind three and one-half turns to dispose the fruit over the sleeve opening whereupon the seizing fingers gradually and radially release the fruit to thence fall by gravity down the sleeve.

Turning to the drawing a cylindrical housing 10 is provided with a central aperture to which a tubular cup-like element 11 is secured by a plurality of rivets 12. The element 11 is provided with an integral base or bottom wall 13 having a spring receiving hole 14 and a central aperture to which a central post or ledge shaft 15 is secured by a threaded bolt 16.

Post 15 is of integral construction and consists of a lower cylindrical portion of large diameter 17 and an upper cylindrical portion 18 of small diameter, and as shown in the FIG. 2, the lower portion 17 is provided with a threaded cavity to receive bolt 16 and the upper portion 18 is provided with a threaded cavity receiving therein one end of threaded rod 20 which on the other end mounts fruit platform pad 21. Internally threaded member 19 is mounted on rod 20 intermediate the ends thereof.

The finger actuating assembly of this invention comprises a top plate 30 fixedly secured as by rivets to a sleeve 31 disposed rotatably about the upper portion 18 of post 15, said sleeve 31 being in turn fixedly secured as by welding to a bottom plate 32 having three equidistant radial slots 33 therein.

A plurality of three equally spaced-apart fruit seizing fingers 34 are reciprocally secured by means of hinges 35 to the plate 30, each finger 34 being disposed over a respective radial slot 33 at all times and having a finger extension 34X slidingly disposed in a respective slot 33 at all times. A string receiving pulley wheel 37, preferably of one piece construction, is journaled rotatably about the base of the sleeve 31. The wheel 37 is provided with three suitably curved equally spaced-apart slots 38 of about 180 degrees of curvature.

Thus rotation of the wheel 37 through about 180 degrees causes the fingers 34 to close due to the finger extensions 34X riding in their respective stationary radial slots 33 and moving curved slots 38.

The fingers 34 are provided with pads 40 of relatively soft sponge rubber or other pliant material such as leather, etc. Preferably the fingers 34 are provided with a pair of spaced-apart hooks 41 disposed at the opposite ends of the fingers 34. Where small fruit is to be picked a rubber band 42 of suitable strength is disposed between the hooks 41 of a finger and thus the finger is adapted to engage small fruit.

As shown in FIG. 2, the platform 21 and also the plate 30 are provided with bent portions normally disposed in the direction of the mouth of a long fruit receiving sleeve 43.

A tubular cylindrical shield 44 is provided to keep out twigs and leaves from the working moveable parts. The shield 44 is secured to the cylinder 10 by conventional means such as screws 45 and is provided with a fixed dual aperture bracket 46 adapted to receive a dual prong loop wire 47 of the sleeve 43. The sleeve 43 is preferably made flat foldable and with an interiorly disposed U-shaped portion 43X which is easily pushed outwardly by the fruit in the sleeve.

The platform 21 is adjustable in height relative to plate 30 to accommodate variously long fruit. Thus threaded rod 20 is disposed in a threaded aperture of the cavity of the threaded member 19 and after selection of a desired height is locked to the plate 30 by wing nut 48.

The device of this invention comprises two coil springs. One coil spring 50 is disposed in the finger actuating assembly. The other coil spring 51 is disposed in the cylinder 10 and is used in conjunction with the twisting of the fruit three and one-half revolutions to disengage it from the tree.

Coil spring 50 has its top end (FIG. 2) disposed in a suitable aperture in plate 30 and its bottom end is disposed in an aperture in wheel 37.

Coil 51 has its top end disposed in a aperture in plate 32 and its bottom end is disposed in aperture 14 of the tubular element 11.

According to this invention, a depending pillar 53 of semi-cylindrical construction (FIG. 5) is conventionally and fixedly secured to bottom of the plate 32. A quadrant gear 54 of four teeth receiving spaces is reciprocally moveable about a journal post 55 between a pair of fixed abutment posts 56.

As shown in FIG. 5, the semi-cylindrical pillar 53 is normally disposed in inoperative or rest position in the first tooth receiving cavity of the quadrant gear 54. The gear 54 is provided with a conventional spring loaded ball detent 57, the ball of which selectively engages one of a plurality of four cavities 58.

The fruit picker finger mechanism is secured by a conventional bracket 60 having a pair of wing nuts to an extensible section tubular pole 61. The sections of the pole 61 are joined by means of a tubular preferably wooden connector 62 (FIG. 6). The nylon string 63 used by the operator is disposed about the pulley wheel 37 about four turns and thence through the casing 10 opening (FIG. 3) about a suitably disposed fixed wheel 64 and finally into an aperture 65 of the tubular pole 61. The string 63 emerges from the interior of the pole from another aperture 66 located near the bottom of the sectional pole 61. Thus location of the string within the pole 61 removes it from the danger of being tangled by the branches of the tree.

In the operation of the device of this invention, the fruit picker is directed toward the fruit so that the fruit engages the platform 21. The string 63 is then gradually pulled so that about eight inches or less of travel of the string causes the three fingers 34 to close without rotation of said fingers since the resistance of the detent 57 is sufficient to prevent rotation of the plate 32. In this operation spring 50 is slightly coiled up between the moving wheel 37 and the stationary plate 30.

After the fingers 34 are closed, further pulling of the string 63 causes the plate 32 and pillar 53 thereon in housing 10 to overcome the resistance of the detent 57 of gear 54.

Since the lower end of the sleeve 31 is rotatably disposed upon the ledge 17X formed by the larger diameter of shaft 15, the entire upper fruit seizing assembly rotates until the quadrant gear 54 has rotated from one post 56 to the other, caused by three or so revolutions of the plate 32 about shaft 15 and against said quadrant gear. These about three revolutions are sufficient to twistingly tear the fruit away from the tree. Simultaneously these three revolutions wind up the coil spring 51 disposed at one end fixedly in aperture 14 and at the other end in the rotatable plate 32.

Upon release of the pulled string 63, the spring 51 unwinds itself and then spring 50 unwinds itself with return of the string upon the pulley wheel. When the string is fully returned the fruit is over the mouth of the sleeve 43 and released therein.

This invention was described herein by means of an illustrative embodiment but it is not limited to this illustration.

I claim:

1. A fruit picker mechanism comprising a cylindrical housing having a centrally apertured base, a tubular cup-like element fixedly secured to said housing base and having a centrally apertured bottom wall, a dual diameter ledge shaft fixedly and centrally secured to said bottom wall aperture of said element and having the smaller diameter portion extending above the base of said housing, a quadrant gear of predetermined number of teeth adapted to oscillate between fixed posts to limit the twisting action on seized fruit secured to the inside surface of the housing base adjacent the aperture thereof, detent means disposed in said gear co-acting with said housing to effect a preselected resistance to gear movement, a rotatable fruit seizing assembly having a tubular member mounted on said ledge shaft, a centrally apertured top plate secured to the top of said tubular member, a bottom plate secured adjacent the bottom of said tubular member and having a plurality of three equidistant radial slots, a pillar post fixed to said bottom plate and adapted to engage said quadrant gear, said assembly having a string receiving pulley wheel rotatably mounted on said tubular member, said pulley wheel having a plurality of three equidistant curved slots, said assembly also having three equidistant swingable fruit engaging fingers hingedly mounted on the periphery of said top plate, said fingers each having suitable extensions disposed in a respective pair of overlying curved slot and underlying radial slot, a first spring coil disposed about said tubular member and secured at one end to said top plate and at the other end to said pulley wheel, said assembly being disposed upon said shaft and fixedly secured thereto, a second coil spring secured at one end to the base of said tubular cup element and at the other end to said bottom plate having said radial slots, and string means disposed through an aperture in said housing and about said pulley whereby a predetermined pull on the string causes the fingers to radially close upon and seize the fruit against the resistance of said first spring and said detent ball and thereafter continued pulling of the string causes the fruit holding assembly and its pillar post to rotate against the resistance of said second spring and to overcome the resistance of said ball detent of said quadrant gear for a preselected number of pillar post turns to thereby twist the fruit away from said tree.

2. The mechanism of claim 1 comprising a bracket removably secured to said tubular cup like element, a pulley directional wheel secured to the outside of said housing, selectively extendable apertured tubular pole means secured moveably to said bracket and tubular connectors adapted to secure adjacent pole extensions whereby said string from said housing aperture is directed over said directional pulley wheel and into an aperture of said pole for communication within said pole to a bottom exit aperture for said string thereby shielding the operative string from entanglement with the branches of a tree.

3. The mechanism of claim 2 comprising, a threaded securing nut for securing fixedly said assembly to said shaft, said nut having a threaded borehole therein, a selectively extendable platform having an integral threaded rod disposed in said threaded allen nut, a wing nut disposed on said threaded rod to lock the platform in place whereby small fruit may be firmly seized.

4. The mechanism of claim 3 comprising a pair of spaced-apart opposing clips on each of said fingers, and elastic means disposed on each pair of clips whereby small fruit may be advantageously seized without injury thereto.

References Cited

UNITED STATES PATENTS 2,581,236   1/1952   Cardinale _____ 56—334

ANTONIO F. GUIDA, *Primary Examiner.*

RUSSELL R. KINSEY, *Examiner.*